Figure 1:
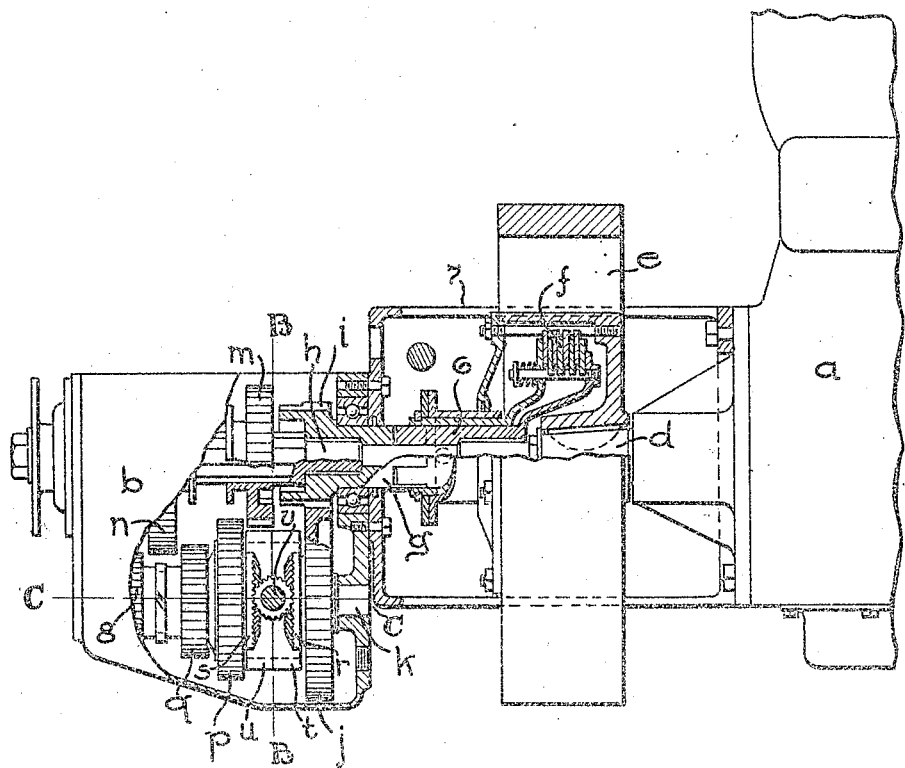

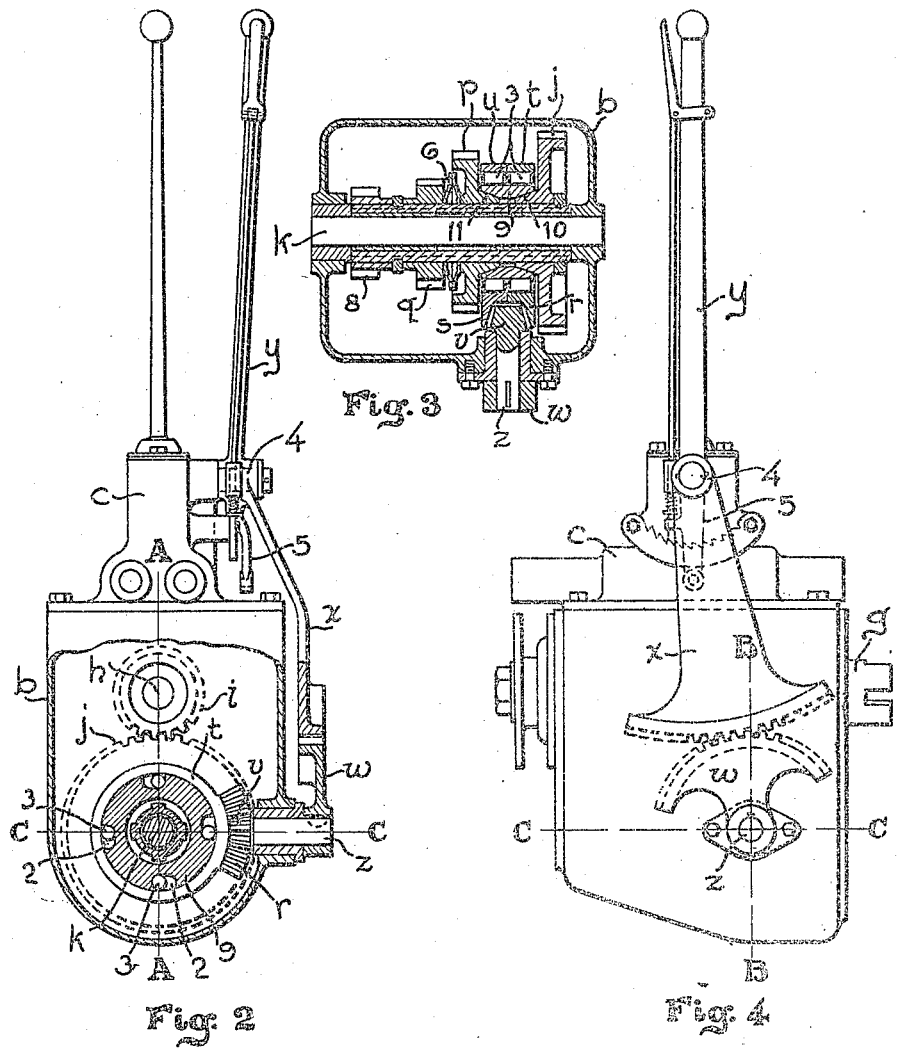

UNITED STATES PATENT OFFICE.

CECIL HAMELIN TAYLOR AND BOUDEWIJN B. NEUTEBOOM, OF DETROIT, MICHIGAN.

STARTER.

1,209,229.  Specification of Letters Patent.  Patented Dec. 19, 1916.

Application filed August 5, 1912. Serial No. 713,246.

*To all whom it may concern:*

Be it known that we, CECIL HAMELIN TAYLOR, a citizen of the United States, and BOUDEWIJN B. NEUTEBOOM, a subject of the Queen of the Netherlands, residing at Detroit, county of Wayne, State of Michigan, have invented a certain new and useful Improvement in Starters, and declare the following to be a full, clear, and exact description of the same, such as will enable others skilled in the art to which it pertains to make and use the same, reference being had to the accompanying drawings, which form a part of this specification.

Our invention relates to starters for internal combustion engines and an object of our improvements is to provide an improved mechanical starter and one that is compactly and conveniently arranged with reference to other mechanism incident to the application of the power of the engine. We accomplish this object in the device illustrated in the accompanying drawings, in which, Figure 1, is a side view of a part of an internal combustion engine, the gear casing, and a part of the transmission mechanism, parts being broken away to show the internal construction, and the cover of the gear casing being removed. Fig. 2, is a partial section on the line B—B Figs. 1 and 4 looking from the left of said line. Fig. 3, is a section on the line C—C Figs. 1, 2 and 4, looking from above. Fig. 4, is a side elevation of the transmission gear case.

$a$ is a portion of an internal combustion engine.

$b$ is a transmission gear case.

7 is a yoke connecting the crank case of the engine $a$ to the transmission gear casing $b$.

$d$ is the main shaft of the engine.

$e$ is the fly wheel, keyed upon the shaft $d$.

6 is an intermediate shaft.

$f$ is a clutch adapted to engage and disengage the fly wheel $e$ and the intermediate shaft 6. The shaft 6 is sleeved upon the projecting end of the main shaft $d$ of the engine.

$g$ is a shaft resting in a bearing in the end of the gear case $b$ and engaging by a toothed clutch with the intermediate shaft 6.

$i$ is a gear wheel upon, or integral with, the shaft $g$.

$k$ is a counter shaft resting at its ends in bearings in the end walls of the gear casing $b$.

$j$ is a gear wheel upon the shaft $k$, its teeth engaging the teeth of the gear wheels $i$.

$h$ is a transmission shaft extending parallel to the shaft $k$, one end resting in a bearing in the shaft $g$ and the other end in an end wall of the casing $b$.

$m$ and $n$ are gear wheels adapted to slide on the shaft $h$ but restrained from angular motion relative thereto.

$p$, $q$ and 8 are gear wheels upon the counter shaft $k$. By shifting the gear wheels $m$ and $n$ to engage various gear wheels $p$, $q$ 8 on the counter shaft various combinations of the gearing are made to vary the angular motion transmitted from the shaft $g$ to the shaft $h$ in a usual manner. The gear wheels $j$ and $p$ have their hubs extending toward each other, the peripheries of which have conical surfaces 10 and 11 as shown in Fig. 3.

9 is a ring having its inner surface shaped to fit upon the conical peripheries 10 and 11 of the hubs of the wheels $j$ and $p$.

$t$ and $u$ are annuli lying side by side and fitting around the ring 9.

6, is a spring acting to force the wheel $p$ toward the wheel $j$ thus causing a frictional resistance between the ring 9 and the conical surfaces 10 and 11 of the hubs of said gear wheels.

2 (Fig. 2) indicates slots formed in the peripheries of the ring 9. The bottom surfaces of said slots gradually approach toward the periphery of the ring in one direction.

3 are steel rollers placed in the slots 2, the diameters of said rollers being such that they shall engage the bottom of said slots and the inner wall of an annulus $t$ or $u$ when they are located toward one end of said slots and be free at the other end thereof, so that relative motion between said ring and annuli is permitted in one direction but restrained in the other.

The construction and arrangement of the parts just described is a well known one that shall cause the rollers 3 to bind against either of the annuli $t$ or $u$ when the same is moved in a negative direction as shown in Fig. 2, but permitting a free movement of said annuli in the other direction.

$r$ is a toothed segment upon the annulus $t$, and $s$ is a toothed segment upon the annulus $u$.

$v$ is a conical gear wheel, its teeth engaging the teeth of the segments $r$ and $s$, which latter are formed to correspond to said conical gear wheel.

$z$ is a shaft adapted to turn in a bearing in the side $c$ of the gear casing $b$ and extending laterally through said gear case.

$w$ is a segmental rack keyed upon the outer end of the shaft $z$.

$y$ is the brake lever pivoted at 4 to the cover $c$ of the gear case.

is an arm extending from, and forming a part of the lever $y$, its lower end being provided with a segmental rack, its teeth engaging the teeth of the segmental rack $w$.

5 is the arm by which the lever arm $y$ actuates the brakes. The connection, being the conventional one, is not shown.

The operation of the above described device is as follows: To start the engine the brake lever $y$ is oscillated to a less extent than that required to set the brake, thus oscillating the shaft $z$ and gear wheel $v$ which actuates the annuli $t$ and $u$ in opposite directions, the one of said annuli moving in one direction binds upon the ring 9 carrying the gear wheel $j$ with it and turning the gear wheel $i$, which being in engagement with the crank shaft turns the latter to start the engine. When one of the annuli $t$ $u$ is moving to actuate the ring 9 the other is moving backward to a position to again clutch the ring 9 when it is again moved forward on the reversal of the movement of the brake lever $y$. When the engine is to be started the change speed gear is adjusted so that it shall not actuate the transmission shaft $h$.

It is frequently desirable to move an automobile a short distance independent of the engine; in such a case the clutch $f$ is adjusted to free the engine from the transmission mechanism and the change speed gear is adjusted in the usual way to connect the starting mechanism with the transmission shaft $h$, the starter is then operated to move the vehicle. The frictional connection between the ring 9 and the wheel $j$ is provided to prevent a backward motion of the engine being transmitted through the starting mechanism.

What we claim is:—

1. In a starter for an internal combustion engine, the combination of a change-speed gearing, a transmission shaft, a part of said gearing, a transmission shaft, a part of said change-speed gearing being connected with the engine and a part with the transmission shaft, and a device adapted to actuate the part of said change-speed gearing connected with the engine.

2. In a starter for an internal combustion engine, the combination of a change-speed gearing connected with said engine, an actuating device connected with said engine and adapted to act through a portion of said change-speed gearing, said actuating device and change-speed gearing having a constituent part in common.

3. In a starter for an internal combustion engine, a change speed gearing connected with said engine, and a mechanical starter, said change speed gear and starter having a constituent part in common.

4. In a starter for an internal combustion engine, a change speed gearing having gear wheels one of said gear wheels being connected to actuate the engine, a part 9 located between said gear wheels, and a spring acting to force one of said gear wheels toward the other to produce frictional engagement between said part and one of said gear wheels and means for actuating the part 9 to start the engine.

5. In a starter for an internal combustion engine, a change speed gearing having gear wheels provided with conical hubs extending toward each other, a part 9 located between said wheels and fitting upon said conical hubs, and a spring acting to force one of said gear wheels toward the other to produce frictional engagement between said part and said conical hubs and means for actuating the part 9 to start the engine.

6. In a starter for an internal combustion engine, a change speed gearing having a gear wheel, said gear wheel being connected with said engine, a part connected with said gear wheel to actuate the same, annuli surrounding said part, an intermittent clutch mechanism between said annuli and said part, and means for oscillating said annuli alternately.

7. In a starter for an internal combustion engine, a change speed gearing having a gear wheel, said gear wheel being connected with said engine, a part connected with said gear wheel by a frictional connection to actuate the same, annuli surrounding said part, an intermittent clutch mechanism between said annuli and said part, and means for oscillating said annuli alternately.

8. In a starter for an internal combustion engine, a change speed gearing having a gear wheel, said gear wheel being connected to actuate the engine, a part 9, means for producing frictional contact between said part and said gear wheel to actuate the same, annuli surrounding said part, an intermittent clutch mechanism between said annuli and said part, each of said annuli being provided with a rack segment, a gear wheel between said segments, its teeth engaging the teeth of said segments, and means for oscillating said gear wheel.

9. In a starter for an internal combustion engine, a change speed gearing having a gear wheel, said gear wheel being connected to actuate the engine, a part 9, means for producing frictional contact between said part and said gear wheel to actuate the same, annuli surrounding said part, an intermittent clutch mechanism between said annuli and said part, each of said annuli being provided with a rack segment, a gear wheel between said segments, its teeth engaging the teeth of said segments, and means for oscillating said gear wheel, a brake lever and mechanism connecting said brake lever and gear wheel whereby the oscillation of said lever shall oscillate said gear wheel.

10. In a starter for an internal combustion engine, a change speed gear having a shaft, including a gear wheel on said shaft, means for connecting said gear wheel with the engine to actuate the same, annuli surrounding said shaft and connected with said gear wheel through intermittent clutches, and means for oscillating said annuli alternately.

In testimony whereof, we sign this specification in the presence of two witnesses.

CECIL HAMELIN TAYLOR.
BOUDEWIJN B. NEUTEBOOM.

Witnesses:
AGNES M. HIPKINS,
ELLIOTT J. STODDARD.